United States Patent [19]
Mori

[11] Patent Number: 4,709,304
[45] Date of Patent: * Nov. 24, 1987

[54] LIGHT RADIATOR

[76] Inventor: Kei Mori, 3-16-3-501, Kaminoge, Setagaya-ku, Tokyo, Japan

[*] Notice: The portion of the term of this patent subsequent to Sep. 2, 2003 has been disclaimed.

[21] Appl. No.: 769,531

[22] Filed: Aug. 26, 1985

[30] Foreign Application Priority Data

Sep. 7, 1984 [JP] Japan .................. 59-188674

[51] Int. Cl.⁴ .............................. F21V 7/04
[52] U.S. Cl. ........................ 362/32; 362/96; 362/223; 362/318; 362/805; 350/486; 350/632; 350/96.1; 350/258; 417/534; 417/557
[58] Field of Search .................. 362/32, 96, 217, 223, 362/232, 277, 318, 319, 805, 154; 350/486, 632, 96.1, 258; 92/138; 417/557, 534

[56] References Cited

U.S. PATENT DOCUMENTS

| 969,847 | 9/1910 | Davis | 92/138 |
|---|---|---|---|
| 2,023,250 | 12/1935 | Stalder | 92/138 |
| 2,472,647 | 6/1949 | Covins | 92/138 |
| 2,627,251 | 2/1953 | Sprague et al. | 92/138 |
| 4,443,163 | 4/1984 | Gaither | 417/534 |

Primary Examiner—Craig R. Feinberg
Assistant Examiner—David A. Okonsky
Attorney, Agent, or Firm—Jordan and Hamburg

[57] ABSTRACT

A light radiator for diffusing and radiating light rays, transmitted through an optical cable or the like, outside of the optical conductor cable, includes a transparent cylinder, an optical conductor for guiding light rays into the cylinder, an optical means movably accommodated in the cylinder for reflecting and radiating the light rays, and a driving device for moving the optical means along the axial direction of the cylinder. The driving device includes first and second liquid pumps comprising a piston cylinder, a driving mechanism for reciprocally moving the pistons, a first liquid-supplying pipe connected with one end portion of the cylinder through one end wall of the first liquid pump, a second liquid-supplying pipe connected with the other end wall of the cylinder through one end wall of the second liquid pump, optical oil placed in the liquid pump and cylinder, the first liquid pump discharging the optical oil outside thereof and the second liquid pump sucking the same from the cylinder at the time of operating the liquid pump.

6 Claims, 4 Drawing Figures

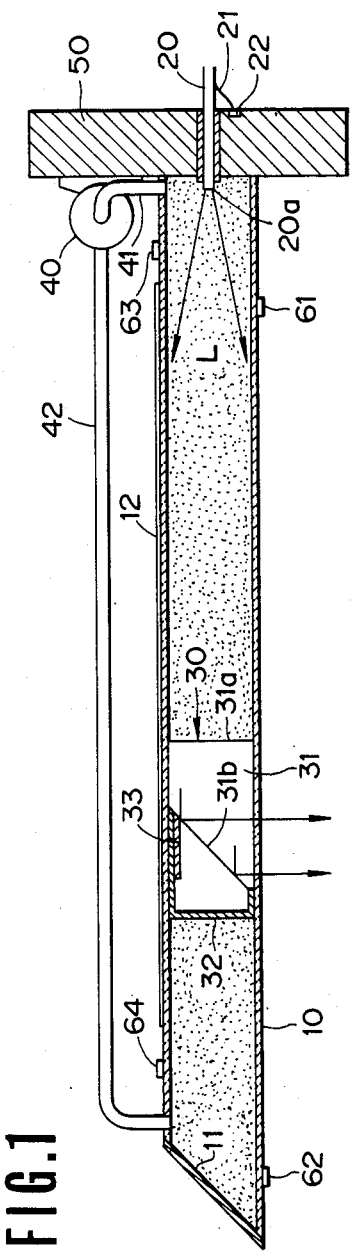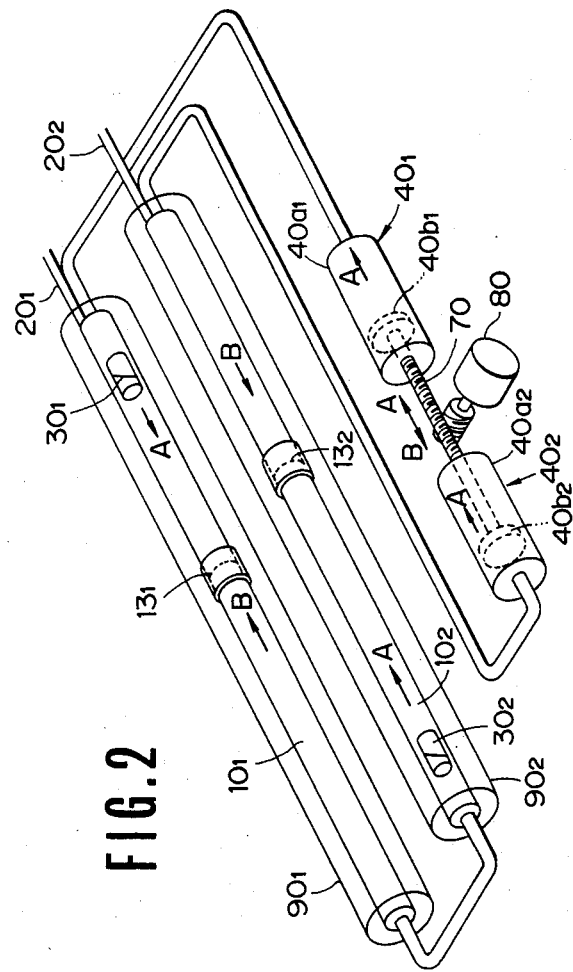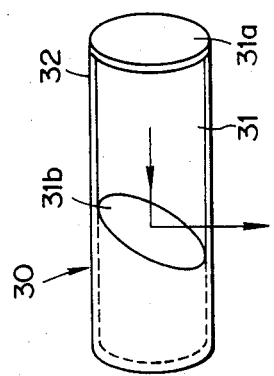

LIGHT RADIATOR

BACKGROUND OF THE INVENTION

The present invention relates to a light radiator for effectively diffusing and radiating light rays which have been transmitted through an optical cable or the like, outside of the optical conductor cable.

The present applicant has previously proposed various ways to focus solar rays or artificial light rays by the use of lenses or the like, and to guide the same into an optical conductor cable, thereby transmitting them onto an optional desired place. The solar rays or the artificial light rays transmitted and emitted in such a way are used in the photo-synthesis process and for illuminating or other like purposes, such as for example to promote the growth of plants.

However, in the case of utilizing the light energy for growing plants, the light rays transmitted through the optical conductor cable have directional characteristics. Supposing that the end portion of the optical conductor cable is cut off and the light rays are emitted therefrom, then the radiation angle for the focused light rays is, in general, equal to approximately 46°. That is quite a narrow field. In the case of utilizing the light energy as described above, it is impossible to obtain a desirable amount of illumination by simply cutting off the end portion of the optical conductor cable and thereby letting the light rays emit therefrom.

Therefore, the present application has already proposed various kinds of light radiators capable of effectively diffusing the light rays which have been transmitted through them and for radiating the same rays for illuminating a desired area. The present invention extends the idea and, in particular aims at applying intensified light rays to a desired place and to keep the light source at a distance to plants and to move the light source back and forth in order to supply light rays over a wider area.

SUMMARY OF THE INVENTION

It is an object of the present invention to provide a light radiator capable of effectively emitting solar rays or artificial light rays which were transmitted through an optical conductor cable outside the same for nurturing plants.

It is another object of the present invention to provide a light radiator capable of effectively moving the optical means installed in a transparent cylinder.

It is another object of the present invention to provide a light radiator constructed simply and at low cost.

The above-mentioned features and other advantages of the present invention will be apparent from the following detailed description which goes with the accompanying drawings.

BRIEF DESCRIPTION OF THE DRAWINGS

FIG. 1 is a construction view showing an embodiment of a light radiator previously proposed by the present applicant;

FIG. 2 is a construction view for explaining an embodiment of a light radiator according to the present invention;

FIG. 3 is a cross-sectional view showing an embodiment of the optical means preferably employed in the present invention.

DESCRIPTION OF THE PREFERRED EMBODIMENTS

Figure 2A:
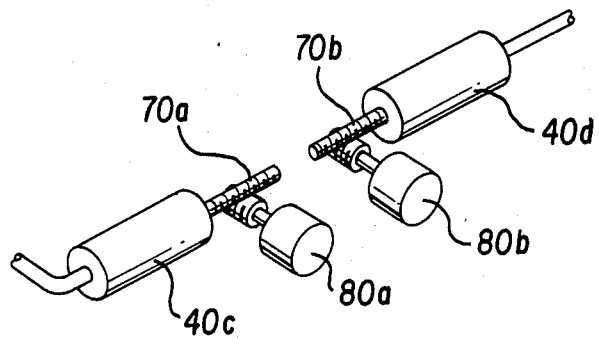
FIG. 2A is a partial view of an alternate embodiment.

The present applicant has previously proposed various kinds of light radiators capable of effectively diffusing light rays which have been transmitted through an optical conductor cable and for using them in lighting a desired area.

FIG. 1 is a cross-sectional view for explaining an embodiment of a light radiator previously proposed by the present applicant. In FIG. 1, 10 is a transparent cylinder, 20 an optical conductor, 30 an optical means, 40 a pump, and 50 a foundation.

The cylinder 10 is filled with optical oil. The light emitting end portion 20a of the optical conductor 20 is installed at one end of the cylinder 10. The light rays transmitted through the optical conductor 20, are emitted into the cylinder 10 from the light emitting end 20a of the optical conductor 20 and then transmitted toward the other end of the cylinder 10 and reflected on the inner wall surface as well as the outer wall surface thereof.

A cylindrical optical means 30 is slidably inserted into cylinder 10. The optical means 30 consists of a cylindrical optical conductor 31 having one end surface 31a on the side of the light rays' transmission, formed on a plane surface and another surface 31b at the opposite side formed on an inclined plane, as well as a cover member 32 for forming an air chamber on the side of the inclined surface 31b by tightly closing the side of the inclined surface 31b.

Consequently, the light rays L guided into the cylinder 10, as mentioned before, enter the optical means 30 through the plane surface 31a of the optical conductor 31, are reflected on the inclined surface 31b at the opposite side of the optical conductor 31, and then are emitted outside of the cylinder 10. The plants or the like, are raised on the underside of the cylinder 10. In such a manner the light rays emitted from the cylinder 10 are supplied to the plants as a light source for performing the photo-synthesis process.

The open end of one pipe 41 is located at the end portion of the cylinder 10 and the open end of another pipe 42 is located at the other end. A differential pressure is applied between the right side and the left side of the optical means 30 by the use of the pipes 41 and 42. The optical means 30 can be moved in right and left directions inside the cylinder 10 by the action of the above-mentioned differential pressure. In such a manner, it is possible to supply light rays to plants.

In FIG. 1, 61 and 62 are photo sensors mounted on the outer circumferential surface of the cylinder 10 at the side where the light rays, reflected by the optical means 30, pass through. The arrival of the optical means 10 at the right end of the cylinder 10 is detected by the photo sensor 61. The detection signal controls the pump 40 so as to generate a differential pressure for moving the optical means 30 to the left. Then the arrival of the optical means 30 at the left end of the cylinder 10 is again detected by the photo sensor 62. The detection signal controls the pump 40 so as to generate a differential pressure for moving the optical means 30 to the right.

Those photo sensors 61 and 62 are constructed so as to be capable of being removed from the cylinder 10 and to be movable alongside the cylinder 10. In such a manner, when the plants are small the photo sensors 61 and 62 can be arranged at a smaller distance, and when the plants have grown the distance therebetween can be widened. Thus light rays transmitted through the optical conductor 20 can be effectively supplied to plants. A reflecting surface installed at the left end of the cylinder 10, opposite the optical conductor 20 is represented by 11. The light rays leaking to the left of the cylinder 10, after passing through the optical means 30, are reflected on the reflecting surface 11 and discharged to the outside of the cylinder 10.

A permanent magnet, installed at a location where the light rays reflected on the reflecting surface $31b$ of the optical means' 30 outer circumferential surface can be passed through without being interrupted, is represented by 33. When such a permanent magnet or magnetic substance 33 is unitarily attached to the optical means 30, it is possible to detect the position of the optical means by detecting the position of the permanent magnet or magnetic substance 33. On that occasion, magnetic sensors 63 and 64 are employed instead of the photo sensors 61 and 62.

Moreover, the position signal detected by the magnetic sensors 63 and 64 is used for controlling the pump 40, as is the case of the afore-mentioned photo sensors. Namely, the optical means 30 is moved in right or left directions according to the position signals. However, in relation to the area of movement of the optical means, it is not always necessary to move the optical means within a designated area according to the detection signal. Instad, the revolutions of the liquid pump 40 are reversed at regular intervals. In such a way the movement area of the optical means can be easily remotely controlled.

A permanent magnet or magnetic substance installed on the outer surface of the cylinder 10 and elongated along the axis of the cylinder 10 is represented by 12. The optical means 30 is regulated so as to put it in a desired position by the use of a permanent magnet or magnetic substance 12. At least one of the permanent magnets or magnetic substances 33 installed on the optical means 30 and the permanent magnet or magnetic substance 12 installed on the cylinder 10 is constructed with a permanent magnet. Consequently, a magnetic force occurs between the permanent magnets or magnetic substances 33 and 12. The optical means 30 therefore is moved by the action of the magnetic force, when the permanent magnet or magnetic substance 33 is opposite to the permanent magnet or magnetic substance 12 on the cylinder 10.

However, in the case of supplying light rays over a wider area by the use of a light radiator as described above, the cylinder 10 has to be made longer. If the cylinder 10 is made longer, the fluid-dynamic resistance value becomes larger and it may therefore become difficult to move the optical means.

The present invention was made in order to solve the problems mentioned above. In particular, the present invention is to provide a light radiator capable of moving the above-mentioned optical means.

FIG. 2 is a construction view for explaining an embodiment of a light radiator according to the present invention. In FIG. 2, $10_1$ and $10_2$ are transparent cylinders, $20_1$ and $20_2$ optical conductors, $30_1$ and $30_2$ optical means, and $40_1$ and $40_2$ liquid pumps.

As is the case of the light radiator shown in FIG. 1, the cylinders $10_1$ and $10_2$ are filled with optical oil. The liquid pumps $40_1$ and $40_2$, respectively, consist of cylinders; $40a_1$, $40a_2$ and pistons; $40b_1$, $40b_2$. The piston $40b_1$ is connected with the piston $40b_2$ through a connecting member 70 which is reciprocally moved in the direction of A and in the direction of B by a driving means 80 like a motor.

Consequently, when the connecting member 70 is moved in the direction shown by an arrow A, the optical oil contained in the liquid pump $40_1$ is pushed out in the direction of A by means of a piston $40b_1$ and supplied to the cylinder $10_1$. Thereby the optical means $30_1$ in the cylinder $10_1$ is moved in the direction of A and the piston $40b_2$ in the liquid pump $40_2$ is moved in the direction of A at the same time. As a result the optical oil in the cylinder $10_2$ is sucked up by the liquid pump $40_2$ and thereby the optical means $30_2$ in the cylinder $10_2$ is moved in the direction of A.

When the connecting member 70 is moved in the direction of B the liquid pumps $40_1$ and $40_2$, respectively, perform the reverse action to the case just mentioned and thereby the optical means $30_1$ and $30_2$ are moved in the direction of B. As described heretofore, according to the present invention, two liquid pumps consisting of a cylinder position are employed in a moving state of linkage. One of the two pumps pours the optical oil into the cylinder under pressure from one end and the other pump sucks the optical oil in from the other end portion of the cylinder, so that the optical oil is easily moved. It follows that the optical means also can be easily moved.

In FIG. 2, an embodiment in which two cylinders $10_1$ and $10_2$ are arranged physically in parallel and are connected in series. The optical means in both of the cylinders are moved in reverse directions respectively. However, the present invention is not limited to the afore-mentioned embodiment only. It can be easily understood that, for example, only one cylinder can be employed or a large number of cylinders can be arranged in series, in parallel or in combination of series and parallel positions.

Couplings for connecting the cylinders with each other are represented by $13_1$ and $13_2$. These couplings are used for connecting a plurality of cylinders in series and for moving the optical means over a wider range. Transparent pipes for protecting the respective cylinders $10_1$ and $10_2$ are represented by $90_1$ and $90_2$. In practice, the cylinders $10_1$ and $10_2$ are made of hard and fragile substances like quartz or the like, while the protective pipes $90_1$ and $90_2$, etc. are constructed of comparatively strong substances like acrylic, etc. In such a manner, it might be possible to prevent the cylinder from being injured or destroyed when an object hits it $10_1$ or $10_2$.

An embodiment in which two liquid pumps $41a$ and $41b$ are connected with each other by means of a connecting member 70, and the connecting member 70 is reciprocally moved by a single driving motor 80 has been described heretofore. However, the present invention is not limited to the above-mentioned embodiment. The driving motors can be independently installed for two liquid pumps and those pumps can be synchronized therewith or with a predetermined timing device. For example, FIG. 2A shows two driving motors $80a$, $80b$, each driving a connecting member $70a$, $70b$ for operating the pumps $40c$, $40d$ respectively. In such an arrangement, the movement of the optical means 30 can be remotely controlled more effectively.

FIG. 3 is a cross-sectional view showing an embodiment of the optical means preferably employed in the present invention. In FIG. 2, 30 is an optical means consisting of a cylindrical optical conductor 31 having one end surface 31a formed on a plane surface and the other end surface 31b formed on an inclined plane surface and a cover member 32 for forming an air chamber at the side of the inclined plane surface 31b by closing the side thereof.

This optical means is the one in which the permanent magnet 33 is omitted from the optical means 30 shown in FIG. 3. As mentioned above, in the case of employing the cylinders $10_1$ and $10_2$ in a horizontal state, the longer side of the cylinder 31, that is, the side 31c is always lowered through the action of gravity. Consequently, the permanent magnets 12 and 33, etc. can be omitted on that occasion and it may be possible to simplify the entire construction of the optical means and thereby decrease the cost.

As is apparent from the foregoing description, according to the present invention, it is possible to provide a light radiator capable of effectively moving the optical means installed in the transparent cylinder. Furthermore, according to the present invention, it is possible to provide a light radiator constructed simply and at low cost.

I claim:

1. A light radiator comprising a transparent cylinder means, an optical conductor means for guiding light rays into said transparent cylinder means through one end of said transparent cylinder means, an optical means movably accommodated in said transparent cylinder means for reflecting said light rays guided into said transparent cylinder means from said optical conductor means and radiating said light rays outside of said transparent cylinder means, a driving means for moving said optical means along an axial direction of said transparent cylinder means, said driving means comprising first and second liquid pumps consisting of a pump piston means and a pump cylinder means, a driving means for reciprocally moving the pump piston means of said first and second liquid pumps, a first liquid-supplying pipe connected with one end portion of said pump cylinder means, a second liquid-supplying pipe connected with the other end portion of said pump cylinder means, and optical oil placed in said first and second pumps and said pump cylinder means, said first liquid pump discharging said optical oil outside thereof and said second liquid pump drawing in said optical oil from said pump cylinder means at the time of operating said first and second liquid pumps.

2. A light radiator as defined in claim 1, wherein said driving means comprises a first driving mechanism for driving said first liquid pump and a second driving mechanism for driving said second liquid pump, said first and second driving mechanisms being independently driven.

3. A light radiator as defined in claim 1, wherein said driving means comprises a connecting member for connecting said first liquid pump with said second liquid pump and a single driving mechanism for reciprocally moving said connecting member.

4. A light radiator as defined in claim 1, wherein said transparent cylinder means comprises at least two cylinders arranged in parallel and connected in series, the movement of said optical means in each cylinder going in opposite directions to each other.

5. A light radiator as defined in claim 4 wherein said cylinders are placed in a transparent protective pipe.

6. A light radiator as defined in claim 4 wherein said cylinders are arranged horizontally, and said optical means consists of a cylindrical, transparent member having one end formed on a plane surface and the other end formed on an inclined plane surface and a transparent, hermetically-sealed container for containing said transparent member and having an air chamber formed at the side of the inclined plane surface.

* * * * *